(12) United States Patent
Huang et al.

(10) Patent No.: US 10,305,801 B2
(45) Date of Patent: May 28, 2019

(54) FORWARDING DATA PACKETS (71) Applicant: HANGZHOU H3C TECHNOLOGIES CO., LTD., Zhejiang (CN)

(72) Inventors: Liwei Huang, Beijing (CN); Ruping Wang, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 212 days.

(21) Appl. No.: 15/304,717

(22) PCT Filed: Apr. 21, 2015

(86) PCT No.: PCT/CN2015/077076
§ 371 (c)(1),
(2) Date: Oct. 17, 2016

(87) PCT Pub. No.: WO2015/161780
PCT Pub. Date: Oct. 29, 2015

(65) Prior Publication Data
US 2017/0041230 A1 Feb. 9, 2017

(30) Foreign Application Priority Data
Apr. 21, 2014 (CN) .......................... 2014 1 0159496

(51) Int. Cl.
*H04L 12/741* (2013.01)
*H04L 12/64* (2006.01)
*H04L 29/06* (2006.01)

(52) U.S. Cl.
CPC ........ *H04L 45/745* (2013.01); *H04L 12/6418* (2013.01); *H04L 69/22* (2013.01); *H04L 12/64* (2013.01)

(58) Field of Classification Search
CPC ....... H04L 69/22; H04L 45/745; H04L 45/54; H04L 12/64; H04L 12/6418; H04L 69/16

USPC .......................................................... 370/392
See application file for complete search history.

(56) References Cited

U.S. PATENT DOCUMENTS 5,390,318 A * 2/1995 Ramakrishnan .... G06F 12/0866
707/E17.038
6,775,281 B1 * 8/2004 Brown .................... H04L 45/00
370/392
2004/0114590 A1 * 6/2004 Harris .................... H04L 29/06
370/389

(Continued)

FOREIGN PATENT DOCUMENTS

CN  102685006 A  9/2012
CN  103354522 A  10/2013

(Continued)

OTHER PUBLICATIONS

International Search Report and Written Opinion, International Application No. PCT/CN2015/077076, dated Jul. 17, 2017, pp. 1-8, SIPO.

*Primary Examiner* — Rownak Islam
(74) *Attorney, Agent, or Firm* — Nolte Intellectual Property Law Group (57) ABSTRACT

A first node receives an original data packet sent from a terminal device. The first node inserts a forwarding identifier into original data packet and forwards the modified data packet to the other node. The other node forwards the data packet according to the forwarding identifier.

15 Claims, 6 Drawing Sheets

(56) References Cited

U.S. PATENT DOCUMENTS

| | | | | |
|---|---|---|---|---|
| 2011/0116443 | A1* | 5/2011 | Yu | H04L 12/413 370/328 |
| 2012/0008629 | A1 | 1/2012 | Chiba et al. | |
| 2015/0188804 | A1* | 7/2015 | Ashwood-Smith | H04L 47/32 370/392 |
| 2015/0244590 | A1* | 8/2015 | Lin | H04L 49/00 370/392 |
| 2015/0295825 | A1* | 10/2015 | Wang | H04L 12/6418 370/392 |
| 2016/0142293 | A1* | 5/2016 | Hu | H04L 45/38 370/392 |
| 2016/0269287 | A1* | 9/2016 | Li | H04L 49/3009 |

FOREIGN PATENT DOCUMENTS

| | | |
|---|---|---|
| CN | 103428094 A | 12/2013 |
| CN | 103560951 A | 2/2014 |
| CN | 103581020 A | 2/2014 |
| CN | 103581021 A | 2/2014 |
| WO | WO-2013/093858 A1 | 6/2013 |

* cited by examiner

| In Port | Vlan ID | Ethernet | | | For ID | IP | | | TCP | |
|---|---|---|---|---|---|---|---|---|---|---|
| | | SA | DA | Type | ID | SA | DA | Proto | Src | Dst |

FORWARDING DATA PACKETS

BACKGROUND

Software Defined Network (SDN) is a new technology of network switching. Its implementation is to transform the data packet forwarding controlled by the traditional switch and router to the independent processes completed by the SDN switch and SDN controller. The SDN switch may maintain a flow table which is similar to the function of the forwarding table in the traditional switch and router. If a data packet to be forwarded has a matched keyword entry (also called as "flow entry") in the flow table, the switch may perform fast forwarding process in a chipset (or similar component) for the data packet. If the data packet does not have a matched keyword entry in the flow table, the data packet may match with a default entry and may be sent to the controller. The controller may calculate a forwarding path which may include a plurality of switches for the data packet. The SDN controller may respectively distribute keyword entry for each switch in the forwarding path so that all switches could know how to process the subsequent data packets of the same flow.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 7:
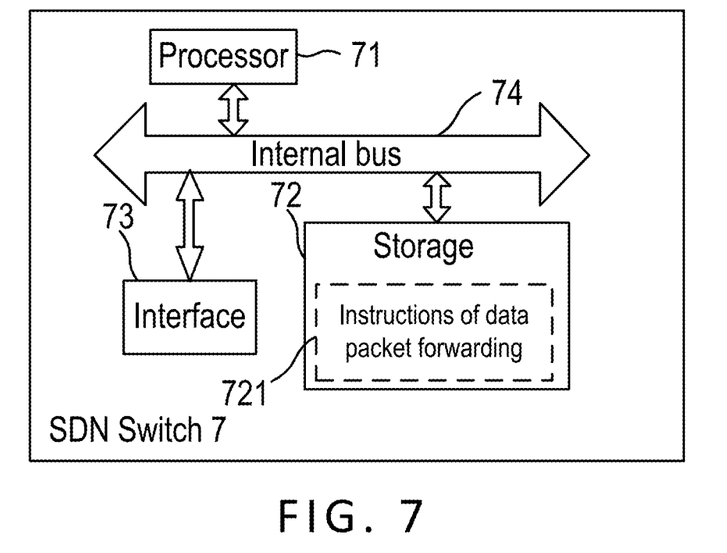
FIG. 7 is a schematic diagram of SDN switch, according to an example of the present disclosure.
Figure 8:
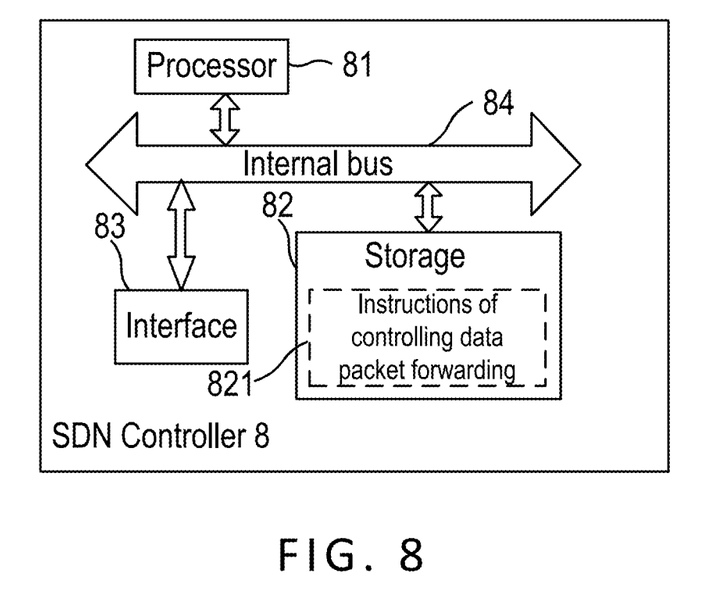
FIG. 8 is a schematic diagram of SDN controller, according to an example of the present disclosure.

Referring to FIG. 7 and FIG. 8, the present disclosure provides a SDN switch 7 and SDN controller 8. The SDN switch 7 (hereinafter "switch") includes a processor 71, a storage 72, an interface 73, and an internal bus 74. Instructions of forwarding data packet 721 may be stored in the storage 72 and could be executed by the processor 71 to perform forwarding data packet process. The SDN controller 8 (hereinafter "controller") includes a processor 81, a storage 82, an interface 83, and an internal bus 84. Instructions of controlling data packet forwarding 821 may be stored in the storage 82 and could be executed by the processor 81 to perform controlling data packet forwarding process. The two process performed by the switch 7 and the controller 8 will be respectively illustrated in below.

As discussing above, a forwarding path for a data packet may be determined by the controller when the switch 7 does not "know" how to process the data packet. In present example, generally, after determining the forwarding path, the controller 8 may respectively generate and distribute entries for the switch 7 which is a node of forwarding path. The process performed by the controller 8, such as detailed process of generating and distributing entries will be described latterly. Please refer to FIG. 1 and FIG. 2, presuming that all entries for processing the data packet have been got by each node (each switch) of the forwarding path, in an example, the detailed forwarding data packet process performed on each node is described as below.

Figure 2:
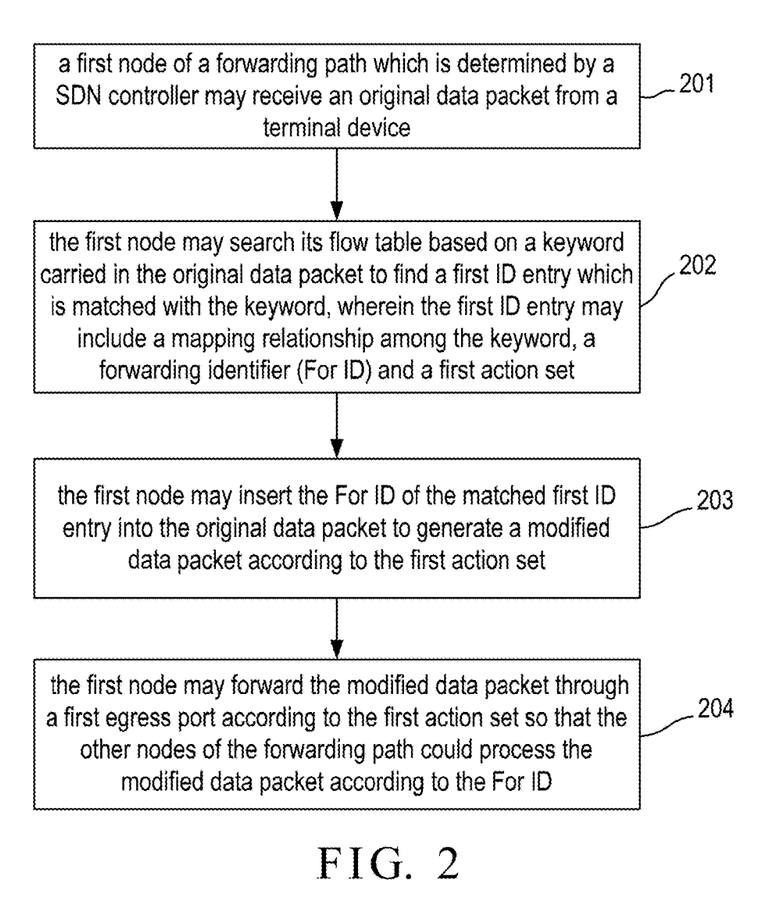
FIG. 2 is a flowchart of forwarding data packet, according to an example of the present disclosure.

At block 201, a first node of a forwarding path which is determined by a SDN controller may receive an original data packet from a terminal device.

Figure 1:
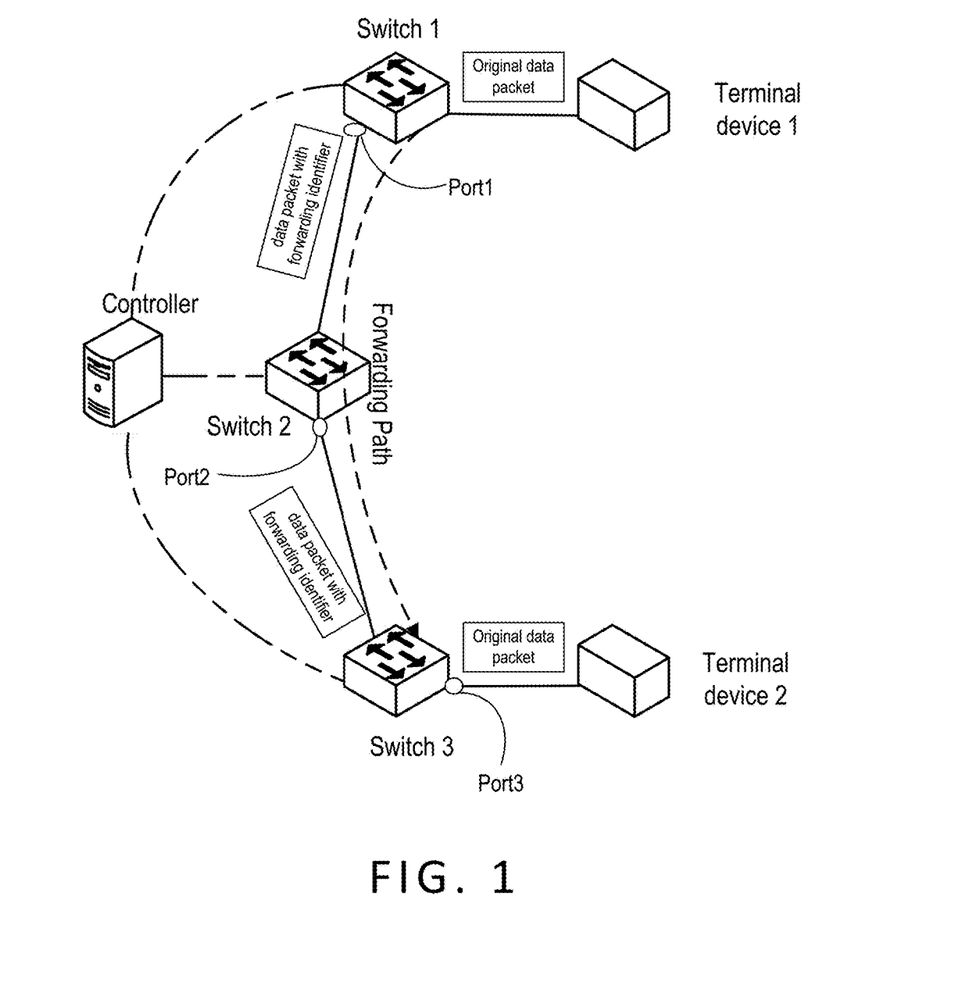
FIG. 1 shows the structure of a SDN network according to an example of the present disclosure.

Data packets sent from terminal device 1 to terminal device 2 may be forwarded in a SDN network. Each data packet to be forwarded in the SDN network may have a corresponding forwarding path which is determined by a controller. The forwarding path includes a plurality of node. Generally, each node is a SDN switch, such as switch 1-3. In the present example, the first node may refer to an edge network node of a SDN network, such a switch 1. The first node is the beginning of forwarding the data packet through the SDN network. The forwarding path may also include a tail node, such as switch 3, at which the data packet is to leave the SDN network. The other nodes, such as switch 2, between the first node and the tail node are called intermediate nodes.

At block 202, the first node may search its flow table based on a keyword carried in the original data packet to find a first ID entry which is matched with the keyword, wherein the first ID entry may include a mapping relationship among the keyword, a forwarding identifier (For ID) and a first action set.

At block 203, the first node may insert the For ID of the matched first ID entry into the original data packet to generate a modified data packet according to the first action set;

At block 204, the first node may forward the modified data packet through a first egress port according to the first action set so that the other nodes of the forwarding path could process the modified data packet according to the For ID.

After receiving the original data packet sent by the terminal device 1, the switch 1 which is a first node may search a first ID entry based on the keyword in its flow table. The keyword of a data packet may include one or more packet characters in different fields of the header portion of the packet, such as MAC address, IP address, VLAN, port and so on. The keyword used in a specific SDN network could be configured by a network administrator. Data packets have the same keyword could be deemed as a data flow. In SDN network, each data packet of a data flow will be processed in a same way, such as forwarding in a same path.

In the present example, an ID entry may be used to help enhance the speed of processing a data packet. The structure of an ID entry may be similar to a keyword entry. For example, the ID entry may also include an action set and related mapping relationship just like a keyword entry. The difference is that an ID entry further includes a For ID. In this example, there are three type ID entries, which will be used by different node of a forwarding path.

A first node, such as switch 1, may have a first ID entry. An intermediate node, such as switch 2, may have a second ID entry. A tail node, such as switch 3, may have a third ID entry. The For ID may help the intermediate node to perform a rapid forwarding process and save the space of the internal storage, such as TCAM or cache of chipset.

The first ID entry may record a mapping relationship among the keyword of the data packet, the For ID and an action set. The action set may include one or more actions, which is used to indicate how to process the data packet when an ID entry is matched with the keyword. In an example, the action set may indicate to insert the For ID of the matched ID entry into the original data packet to generate a modified data packet. The action set may also include forwarding the modified data packet through a first egress port, such as port 1 shown in FIG. 1. The first egress port may be determined by the controller during calculating the forwarding path.

Figure 3:
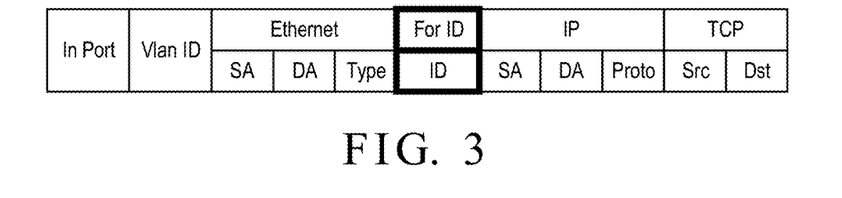
FIG. 3 shows a brief format of a modified data packet, according to an example of the present disclosure.

Referring to FIG. 3, the For ID may be inserted to a predetermined position of the head portion of the original data packet. For example, the For ID may locate between the Ethernet layer and IP layer as shown in FIG. 3. In other examples, the For ID could be inserted to other position of the original data packet.

The keyword may include any character value in any field, or set of character value in different fields, which are located in a header of the data packet. In the example shown in Table 1, keyword could be MAC+Vlan, which means MAC address and Vlan ID are used as the keyword. The first ID entry of the first node is also shown in Table 1. In this example, the For ID is set as "3". Here "3" and "A1+C2" are just used as one arbitrary example and other values of the For ID and keyword may be used, some further examples are given in Table 1 below.

TABLE 1

| MAC + Vlan | For ID | Action set |
|---|---|---|
| A1 + C2 | 3 | Inserting For ID between the Ethernet layer and the IP layer and forwarding modified data packet through a first egress port |
| A2 + C2 | 1 | Inserting For ID between the Ethernet layer and the IP layer and forwarding modified data packet through a first egress port |
| A3 + C1 | 5 | Inserting For ID between the Ethernet layer and the IP layer and forwarding modified data packet through a first egress port |

The content of the action set includes "Inserting For ID between the Ethernet layer and the IP layer". That is, after the first node receives the original data packet which carries "A1+C2" in MAC+Vlan fields, the first node may insert For ID "3" between the Ethernet layer and the IP layer of the original data packet to generate a modified data packet. The content of the action set may also include forwarding modified data packet through egress port which shows how to forward the modified data packet to the next hop. In this example, the next hop is switch 2.

Figure 4:
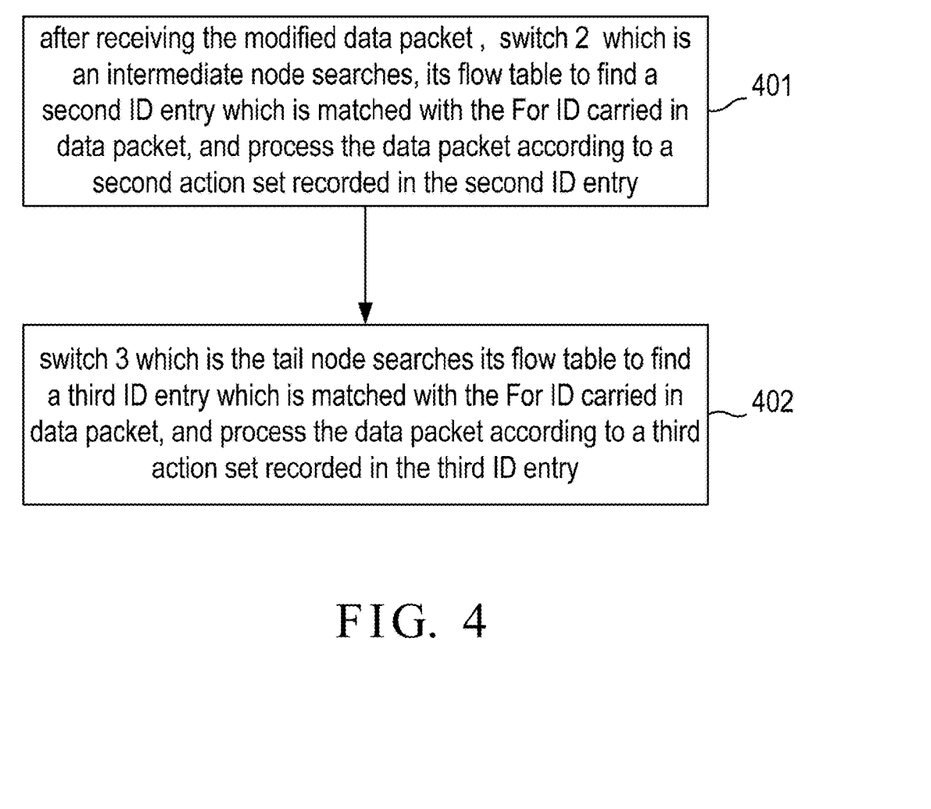
FIG. 4 is another flowchart of forwarding data packet, according to an example of the present disclosure.

Please referring to FIG. 4, at block 401, after receiving the modified data packet forwarded by the first node, the switch 2 may resolve the modified data packet. If the switch 2 finds the For ID in the data packet, the switch 2 may search, according to the For ID, its flow table to find a second ID entry which is matched with the For ID in data packet, and process the data packet according to a second action set recorded in the second ID entry.

The second ID entry may include a mapping relationship between For ID and the second action set as shown in table 2. The second ID entry may be shorter than most keyword entries. In an example, a For ID of an ID entry may occupy 16 bits or even less. In a keyword entry, a keyword may occupy more bits. Please refer to Table 1 and Table 2, a keyword including MAC+Vlan fields may occupy 48+12=60 bits. A second ID entry used by switch 2 may reduce the length of each entry, which could permit switch 2 use a small cache or similar component to support saving more entries in flow table. The second ID entry can also enhance the speed of searching the flow table as the For ID to be searched may be very short.

TABLE 2

| For ID | Action set |
|---|---|
| 3 | Forwarding data packet through a second egress port |
| 1 | Forwarding data packet through a second egress port |
| 5 | Forwarding data packet through a second egress port |

In another example, in a large scale SDN network, there are a lot of intermediate nodes like switch 2. These nodes will process the modified data packet in the same way and benefit from such arrangement like switch 2. Such arrangement could provide a faster forwarding experience for the data packet to be forwarded in the SDN network.

According to table 2 and FIG. 1, the modified data packet is forwarded by switch 2 from a second egress port, such as port 2, to switch 3 according to the second action set. At block 402, Switch 3 which is the tail node in the forwarding path could use a third ID entry to process such data packet. The switch 3 may search, according to the For ID, its flow table to find a third ID entry which is matched with the For ID in data packet, and process the data packet according to a third action set recorded in the third ID entry. The main difference between the second ID entry and third ID entry is the action set. Please refer to Table 3, the third action set of the third ID entry may include "removing the For ID and forwarding the original data packet through a third egress port", such as port 3 shown in FIG. 2.

TABLE 3

| For ID | Action set |
|---|---|
| 3 | removing the For ID and forwarding the original data packet through a third egress port |
| 1 | removing the For ID and forwarding the original data packet through a third egress port |
| 5 | removing the For ID and forwarding the original data packet through a third egress port |

The tail node is a node that the modified data packet leave SDN network. The tail node may remove the For ID to get the original data packet and then forward the original data packet to terminal device 2. This removing action may keep terminal devices getting a transparent deliver service form the SDN network.

It should be noted that each switch connected with terminal device could act as a first node or a tail node. That means in different forwarding paths, a switch could act as different node. For example, when terminal device 2 sends data packet to terminal device 1, switch 3 will act as a first node and switch 1 will act as a tail node. In another example, each switch could process data packet based on node type in a corresponding forwarding path.

In above description, it gives the data plan process of SDN network. The following description will illustrate the controlling data packet forwarding performed by the controller. The process is how the ID entry is generated and distributed to each node of the forwarding path.

Figure 5:
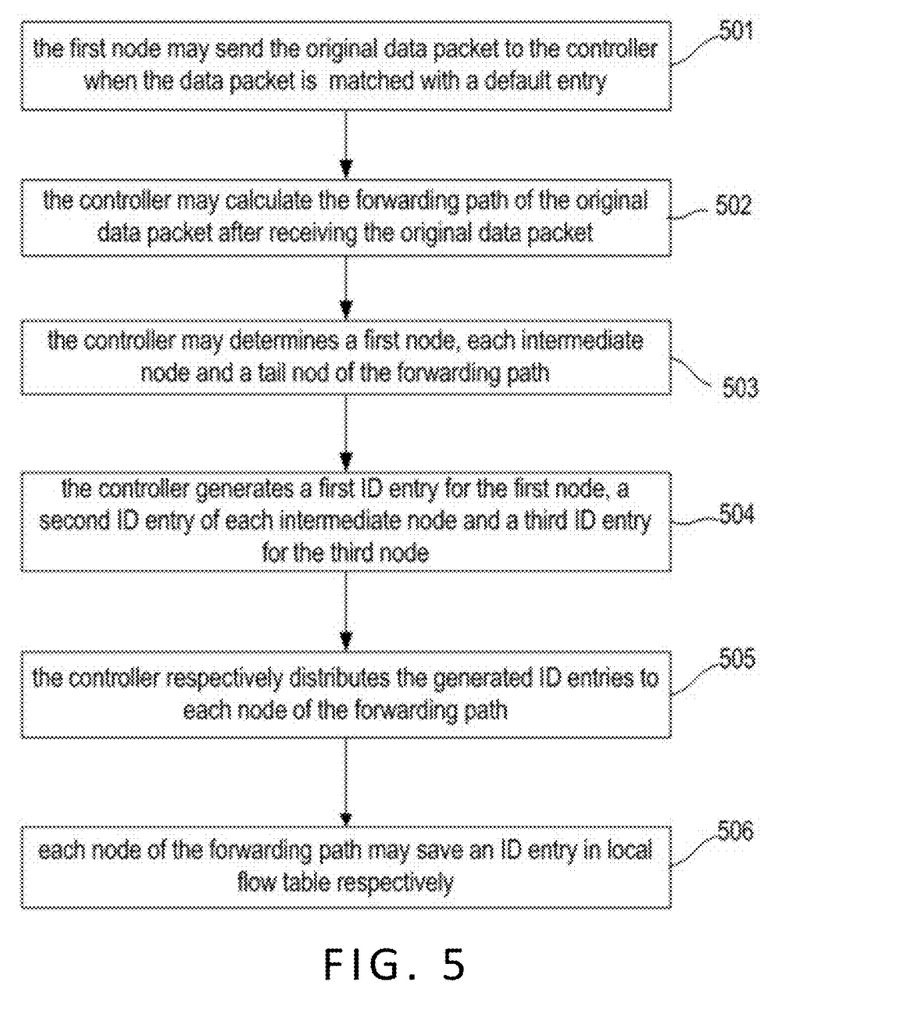
FIG. 5 is a flowchart of controlling data packet forwarding, according to an example of the present disclosure.

Referring to FIG. 5, in block 501, the first node may send the original data packet to the controller when the data packet is matched with a default entry in the flow table.

If the original data packet is a first packet of the data flow. The controller has not calculated a forwarding path, and no ID entry could be distributed to the first node. That means at block 201, no matching first ID entry is found. In an example, when no ID entry is found, the original data packet could be matched with a default entry. The action of default entry may be sent the original packet to the controller. In an example, the switch could use packet-in message defined in OpenFlow protocol to send the original packet to the controller.

In block 502, the controller may calculate the forwarding path of the original data packet after receiving the original data packet.

In block 503, the controller determines a first node, each intermediate node and a tail node of the forwarding path.

In block 504, the controller generates a first ID entry for the first node, a second ID entry of each intermediate node and a third ID entry for the third node.

In block 505, the controller respectively distributes the generated ID entries to each node of the forwarding path.

In block 506, each node of the forwarding path may save an ID entry in local flow table respectively.

As the controller has the detailed information of SDN network, it can arrange reasonable forwarding path for the original data packet of data flow which has the same keyword, such as A1+C2 in the MAC+Vlan fields. Please refer to table 1, the controller may assign For ID "3" to the keyword "A1+C2". The controller may also determine an egress port for the data packet for each node of the forwarding path. As a result, a first ID entry including a mapping relationship among the keyword, For ID and action set is generated. As the data packet is needed to be modified to carry For ID, the first action set may also include insert For ID assigned to a predetermined position of the original data packet. The first ID entry is mainly used to have the original data packet to be modified to carry For ID at the first node. After that, the following node could use For ID as processing basis.

The controller may also generate a second ID entry and a third ID entry by using the same For ID, such as the ID entries described in table 2 and table 3. The second ID entry and third ID entry may have a mapping relationship between For ID and action set instead of a mapping relationship between keyword and action set. At most situation, a length of an ID entry will be shorter than a length of keyword entry, which will help to save the space of flow table occupied and enhance the speed of searching the flow table. After each node saves its ID entry distributed from the controller, these nodes could perform the process described in block 201 to block 205.

Figure 6:
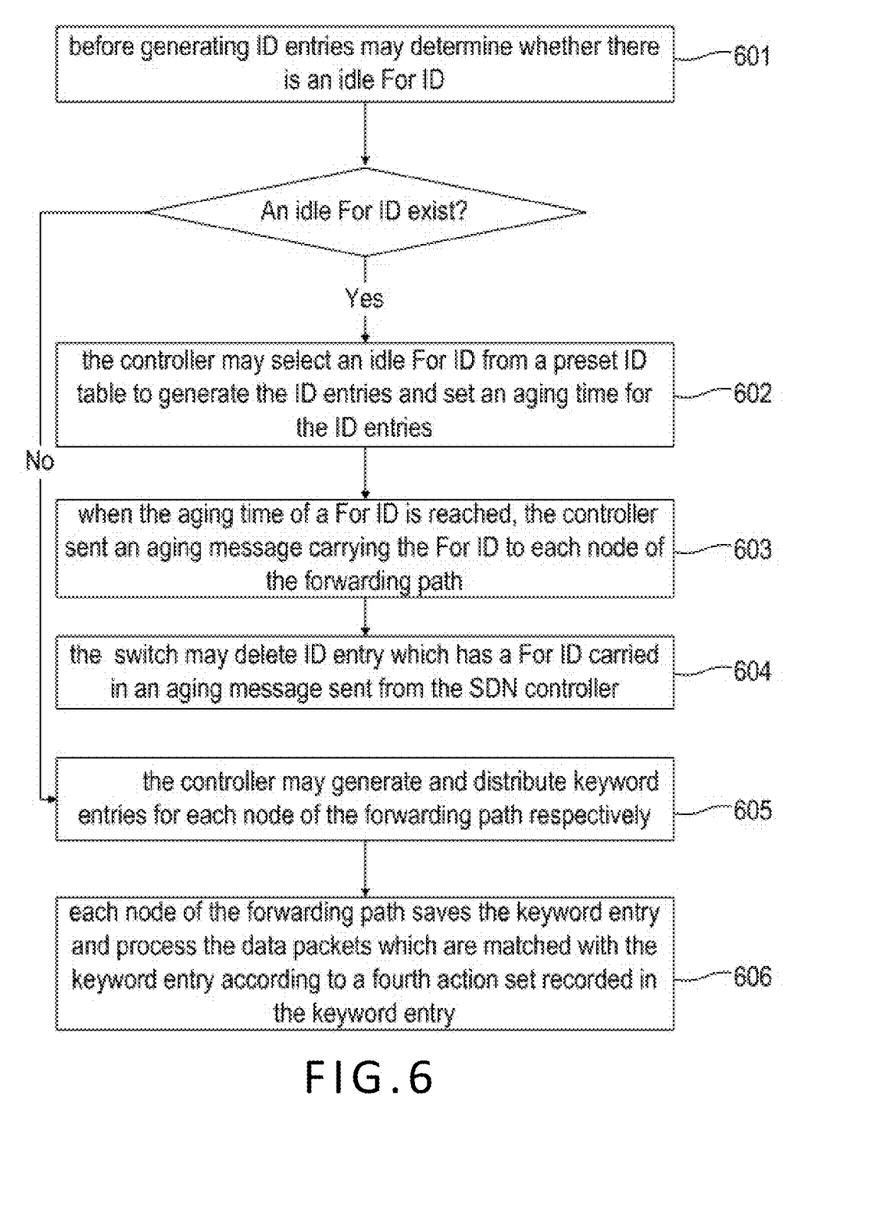
FIG. 6 another flowchart of controlling data packet forwarding, according to an example of the present disclosure.

Please refer to FIG. 6, a more detailed process of the controller is described as below.

At block 601, before generating ID entries may determine whether there is a idle For ID, At block 602, if there is an idle For ID, the controller may select an idle For ID from a preset ID table to generate the ID entries and set an aging time for the ID entries.

At block 603, when the aging time of a For ID is reached, the controller sent an aging message carrying the For ID to each node of the forwarding path.

At block 604, the switch may delete ID entry which has a For ID carried in an aging message sent from the SDN controller.

If there is no idle For ID, at block 605, the controller may generate and distribute keyword entries for each node of the forwarding path respectively.

At block 606, each node of the forwarding path saves the keyword entry and process the data packets which are matched with the keyword entry according to a fourth action set recorded in the keyword entry.

In this example, as the For ID is unique in the SDN network, the controller may not assign a same For ID for different keywords. An ID table may be pre-stored in the controller. The ID table may comprise a plurality of idle For IDs. When an idle For ID is used, the For ID may be recorded in a non-idle state in the ID table. Otherwise when aging time is reached, the state may be recorded as an idle state.

When there is no idle For ID could be used, the controller may perform in a traditional way to generate keyword entry for each node. That means, in this example, it may be compatible with a traditional SDN technology. In this example, the flow table of each node may include ID entries and keyword entries. As describe above the ID entries are different with keyword entries. The switch can perform a multi-level flow table querying when searching its flow table. When an ID entry is matched, the switch can perform a corresponding process described above. When a keyword entry is matched, the switch can also processing the data packet according to a fourth action set recorded in the keyword entry.

The above are only examples of the present disclosure and are not intended to limit the claims. Any changes made, equivalent replacement, or improvement in the protection of the claimed technologies should contain within the range.

The invention claimed is:

1. A method for forwarding data packets in a Software Defined Network (SDN) network, comprising:
    receiving, by a SDN switch, an original data packet from a terminal device when the SDN switch is a first node of a forwarding path which is determined by a SDN controller;
    searching, by the SDN switch, its flow table based on a keyword carried in the original data packet to find a first ID entry which is matched with the keyword, wherein the first ID entry includes a mapping relationship among the keyword, a forwarding identifier (For ID) and a first action set;
    inserting, by the SDN switch, the For ID of the matched first ID entry into the original data packet to generate a modified data packet according to the first action set, and
    forwarding, by the SDN switch, the modified data packet through a first egress port according to the first action set so that other nodes of the forwarding path could process the modified data packet according to the For ID.

2. The method according to claim 1, when the SDN switch is an intermediate node of the forwarding path, the method further comprising:
    after receiving the modified data packet from any first node, the SDN switch searching, according to the For ID, its flow table to find a second ID entry which is matched with the For ID carried in the modified data packet; wherein the second ID entry include a mapping relationship between the For ID and a second action set; and wherein the second action set includes forwarding the modified data packet through a second egress port.

3. The method according to claim 1, when the SDN switch is a tail node of the forwarding path, the method further comprising:
    after receiving the modified data packet from an intermediate node, the SDN switch searching, according to the For ID, its flow table to find a third ID entry which is matched with the For ID carried in the modified data packet; wherein the third ID entry includes a mapping relationship between the For ID and a third action set; and wherein the third action set includes removing the For ID and forwarding the original data packet through a third egress port.

4. The method according to claim 1, further comprising:
processing, by the SDN switch, the modified data packet according to a fourth action set of a keyword entry which is matched with the keyword of the original data packet.

5. The method according to claim 4, further comprising:
sending, by the SDN switch, the original packet to the SDN controller when the original packet is matched with a default entry;
saving ID entry or the keyword entry returned from the SDN controller.

6. The method according to claim 1, further comprising:
deleting, by the SDN switch, an ID entry which has a For ID carried in an aging message sent from the SDN controller.

7. A Software Defined Network (SDN) switch comprising a processor and a storage, the storage comprising instructions of forwarding data packet; wherein when executed by the processor, the instructions cause the processor to:
receive an original data packet from a terminal device when the SDN switch is a first node of a forwarding path which is determined by a SDN controller,
search its flow table based on a keyword carried in the original data packet to find a first ID entry which is matched with the keyword, wherein the first ID entry includes a mapping relationship among the keyword, a forwarding identifier (For ID) and a first action set;
insert the For ID of the matched first ID entry into the original data packet to generate a modified data packet according to the first action set,
forward the modified data packet through a first egress port according to the first action set so that other nodes of the forwarding path could process the modified data packet according to the For ID.

8. The SDN switch according to claim 7, wherein when the SDN switch is an intermediate node of the forwarding path, the instructions further cause the processor to:
after receiving the modified data packet from any first node, search according to the For ID, its flow table to find a second ID entry which is matched with the For ID carried in the modified data packet; wherein the second ID entry include a mapping relationship between the For ID and a second action set; and wherein the second action set includes forwarding the modified data packet through a second egress port.

9. The SDN switch according to claim 7, wherein when the SDN switch is a tail node of the forwarding path, the instructions further cause the processor to:
after receiving the modified data packet from an intermediate node, search, according to the For ID, its flow table to find a third ID entry which is matched with the For ID carried in the modified data packet; wherein the third ID entry include a mapping relationship between the For ID and a third action set; and wherein the third action set includes removing the For ID and forwarding the original data packet through a third egress port.

10. The SDN switch according to claim 7, wherein the instructions further cause the processor to:
process the modified data packet according to a fourth action set of a keyword entry which is matched with the keyword of the original data packet.

11. The SDN switch according to claim 10, wherein the instructions further cause the processor to:
send the original packet to the SDN controller when the original packet is matched with a default entry;
save ID entry or the keyword entry returned from the SDN controller.

12. The SDN switch according to claim 7, wherein the instructions further cause the processor to:
delete an ID entry which has a For ID carried in an aging message sent from the SDN controller.

13. A method for controlling data packets forwarding in a Software Defined Network (SDN) network, comprising:
calculating, by a SDN controller, a forwarding path for an original data packet after receiving the original data packet from a SDN switch;
determining, by the SDN controller, a first node, each intermediate node and a tail node of the forwarding path;
generating, by the SDN controller, a first ID entry for a local flow table for the first node, a second ID entry for a local flow table for each intermediate node and a third ID entry for a local flow table for the tail node; wherein each ID entry includes a mapping relationship between a forwarding Identifier (For ID) and an action set; and
distributing, by the SDN controller, the generated ID entries to each node respectively.

14. The method according to claim 13, wherein the first ID entry is matched with a keyword in the original data packet and includes a mapping relationship among the keyword, the For ID and a first action set; wherein the first action set includes inserting the For ID of the matched first ID entry into the original data packet to generate a modified data packet and forwarding the modified data packet through a first egress port;
wherein the second ID entry includes a mapping relationship between the For ID and a second action set; and wherein the second action set includes forwarding the modified data packet through a second egress port;
wherein the third ID entry includes a mapping relationship between the For ID and a third action set; and wherein the third action set includes removing the For ID and forwarding the original data packet through a third egress port.

15. The method according to claim 13, further comprising: determining, by the SDN controller, whether there is an idle For ID before generating the ID entries;
if there is an idle For ID, the SDN controller selecting the idle For ID from a preset ID table to generate the ID entries and set an aging time for each ID entry;
if there is no idle For ID, the SDN controller generating and distributing keyword entries for each node of the forwarding path respectively;
notifying, by the SDN controller, each node to delete an ID entry which includes a For ID for which the aging time of the For ID is reached.

* * * * *